US010003797B2

(12) United States Patent
Henry

(10) Patent No.: US 10,003,797 B2
(45) Date of Patent: *Jun. 19, 2018

(54) SYSTEMS AND METHODS FOR APPLYING MULTIPLE ENCODINGS TO VIDEO PORTIONS

(71) Applicant: Facebook, Inc., Menlo Park, CA (US)

(72) Inventor: Colleen Kelly Henry, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/451,056

(22) Filed: Mar. 6, 2017

(65) Prior Publication Data

US 2017/0180728 A1    Jun. 22, 2017

Related U.S. Application Data

(63) Continuation of application No. 14/957,453, filed on Dec. 2, 2015, now Pat. No. 9,648,395.

(51) Int. Cl.
*H04N 19/115* (2014.01)
*H04N 19/59* (2014.01)
*H04N 19/146* (2014.01)
*H04N 19/184* (2014.01)

(52) U.S. Cl.
CPC ......... *H04N 19/115* (2014.11); *H04N 19/146* (2014.11); *H04N 19/59* (2014.11); *H04N 19/184* (2014.11)

(58) Field of Classification Search
None
See application file for complete search history.

(56) References Cited

U.S. PATENT DOCUMENTS

| 8,612,624 B2 | 12/2013 | Frueck |
| 9,106,887 B1 | 8/2015 | Owen |
| 2009/0052540 A1 | 2/2009 | Gutman |
| 2011/0276710 A1* | 11/2011 | Mighani ............ H04N 21/4325 709/231 |
| 2012/0106639 A1* | 5/2012 | Yang ...................... G06T 5/002 375/240.16 |
| 2012/0281748 A1 | 11/2012 | Peng |
| 2015/0043333 A1 | 2/2015 | Talakoub |
| 2016/0028651 A1* | 1/2016 | Ramakrishnan ..................... H04N 21/234354 709/226 |
| 2016/0112732 A1* | 4/2016 | Li ........................ H04L 65/605 725/116 |

* cited by examiner

*Primary Examiner* — Hoang Vu A Nguyen Ba
(74) *Attorney, Agent, or Firm* — Sheppard Mullin Richter & Hampton LLP

(57) ABSTRACT

Systems, methods, and non-transitory computer-readable media can identify a beginning portion and a remaining portion of a video to be encoded. A first constant quality variable bit rate encoding process can be applied to the beginning portion, based on a first set of encoding parameters, to produce an encoded beginning portion. A second constant quality variable bit rate encoding process can be applied to the remaining portion, based on a second set of encoding parameters, to produce an encoded remaining portion. The encoded beginning portion can be provided for video playback. The encoded remaining portion can be provided, when requested, for video playback subsequent to the encoded beginning portion.

19 Claims, 10 Drawing Sheets

SYSTEMS AND METHODS FOR APPLYING MULTIPLE ENCODINGS TO VIDEO PORTIONS

CROSS-REFERENCE TO RELATED APPLICATIONS

This application is a continuation of U.S. patent application Ser. No. 14/957,453, filed Dec. 2, 2015, entitled "SYSTEMS AND METHODS FOR TRANSITIONING BETWEEN MULTIPLE VIDEO PORTIONS PRODUCED BASED ON MULTIPLE ENCODINGS," the entire contents of which are hereby incorporated by reference as if fully set forth herein.

FIELD OF THE INVENTION

The present technology relates to the field of media processing. More particularly, the present technology relates to techniques for transitioning between multiple video portions produced based on multiple encodings.

BACKGROUND

Today, people often utilize computing devices (or systems) for a wide variety of purposes. Users can use their computing devices to, for example, interact with one another, create content, share information, and access information. In some cases, a user of a social networking system (or service) can utilize his or her computing device to create and post media content, such as a video, at the social networking system. Subsequent to being uploaded, the video can be accessed via the social networking system.

When the video is uploaded, conventional approaches to handling videos generally involve encoding the entire video to produce a new version of the video that is more suitable for storage or playback. However, the new version produced using such conventional approaches sometimes suffers a significant reduction in video quality relative to the originally uploaded video. Moreover, the producing of the new video can require a substantial amount of time and computing resources. Furthermore, when delivering the new version of the video to a viewer, conventional approaches typically deliver the new version based on the viewer's download capabilities, which can result in undesirable fluctuations in video quality. As such, conventional approaches to handling videos can be unreliable, inefficient, and lacking in quality. These and other similar concerns of conventional approaches can reduce the overall user experience associated with accessing videos.

SUMMARY

Various embodiments of the present disclosure can include systems, methods, and non-transitory computer readable media configured to identify a beginning portion and a remaining portion of a video to be encoded. A first constant quality variable bit rate encoding process can be applied to the beginning portion, based on a first set of encoding parameters, to produce an encoded beginning portion. A second constant quality variable bit rate encoding process can be applied to the remaining portion, based on a second set of encoding parameters, to produce an encoded remaining portion. The encoded beginning portion can be provided for video playback. The encoded remaining portion can be provided, when requested, for video playback subsequent to the encoded beginning portion.

In an embodiment, the first set of encoding parameters can cause the encoded beginning portion to be produced using a first amount of resources and can cause the encoded beginning portion to result in a first data size. The second set of encoding parameters can cause the encoded remaining portion to be produced using a second amount of resources and can cause the encoded remaining portion to result in a second data size. The first amount of resources can be greater than the second amount of resources. The first data size can be less than the second data size.

In an embodiment, the first constant quality variable bit rate encoding process and the first set of encoding parameters can be associated with a first codec. The second constant quality variable bit rate encoding process and the second set of encoding parameters can be associated with a second codec different from the first codec.

In an embodiment, a first video quality of the encoded beginning portion can be within a specified allowable deviation from a second video quality of the encoded remaining portion. The providing of the encoded beginning portion can be associated with a first bandwidth amount. The providing of the encoded remaining portion can be associated with a second bandwidth amount. The first bandwidth amount can be less than the second bandwidth amount.

In an embodiment, each of the first video quality and the second video quality can be determined based on at least one of a structural similarity (SSIM) index or a peak signal-to-noise ratio (PSNR).

In an embodiment, an image softening process can be applied to at least a sub-portion of the beginning portion to produce a softened sub-portion prior to the applying of the first constant quality variable bit rate encoding process to the beginning portion. The encoded beginning portion can include an encoded softened sub-portion. The encoded softened sub-portion can be lesser in data size than the encoded beginning portion.

In an embodiment, the encoded beginning portion can be included within a plurality of encoded beginning portions. Each of the plurality of encoded beginning portions can be respectively associated with a different resolution.

In an embodiment, usage data associated with the video can be acquired from a social networking system. It can be determined, based on the usage data, that at least a specified threshold amount of viewing has occurred with respect to a particular initial duration of the video. A duration of the beginning portion can be determined based on the particular initial duration of the video.

In an embodiment, social engagement data associated with a second video to be encoded can be acquired from a social networking system. It can be determined, based on the social engagement data, that at least a specified threshold amount of social engagement has occurred with respect to the second video. A customized encoding process can be applied to at least a portion of the second video.

In an embodiment, the applying of the customized encoding process to at least the portion of the second video can include applying a third constant quality variable bit rate encoding process to an entirety of the second video, based on a third set of encoding parameters, to produce an encoded second video.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods

Figure 1:
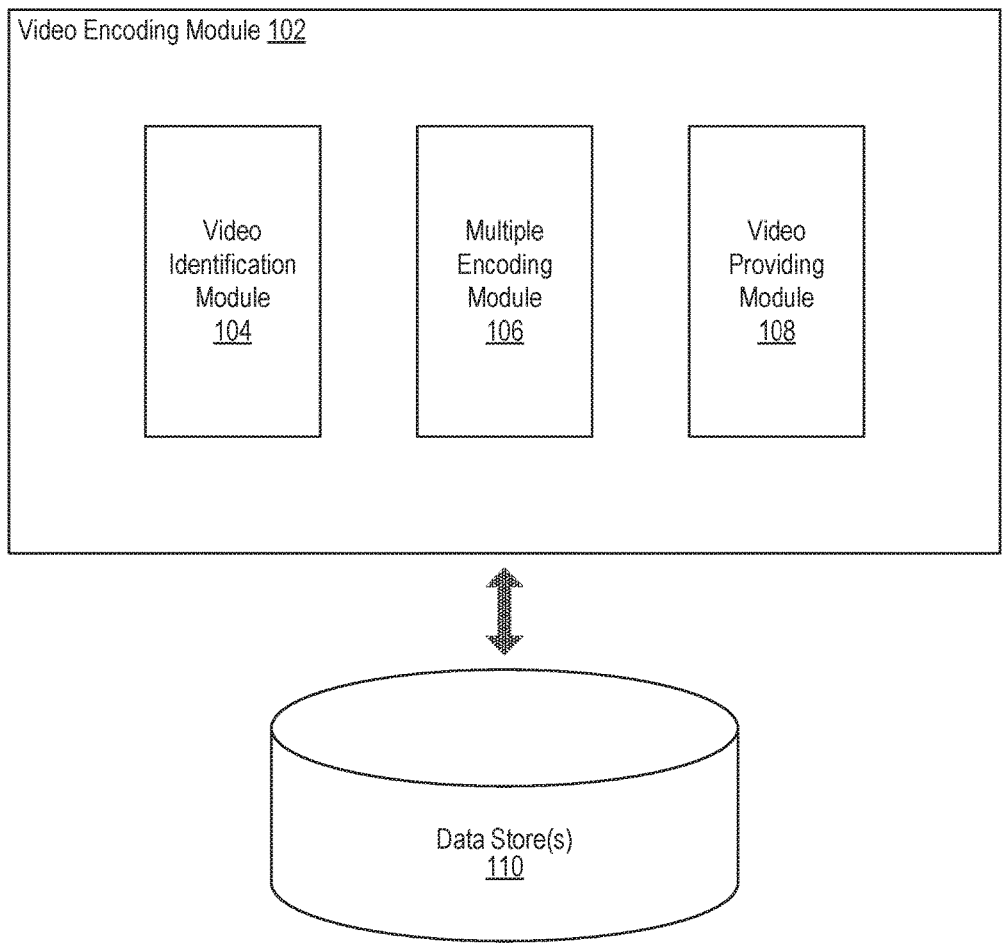
FIG. 1 illustrates an example system including an example video encoding module configured to facilitate transitioning between multiple video portions produced based on multiple encodings, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Transitioning Between Multiple Video Portions Produced Based on Multiple Encodings People use computing devices (or systems) for a wide variety of purposes. Computing devices can provide different kinds of functionality. Users can utilize their computing devices to produce information, access information, and share information. In some cases, users can utilize computing devices to interact or engage with a social networking system (or service). Often times users post or publish media content items at the social networking system, such as by uploading videos to a media system of the social networking system.

Conventional approaches to processing, providing, or handling videos generally involve encoding the entirety of a video uploaded to a video system (e.g., the media system of the social networking system), such that the encoded version of the video can be compatible with or configured to perform properly for the video system. For instance, the encoded version of the video can be more satisfactorily stored and rendered by the video system. However, such conventional approaches of encoding the entirety of the video can be time consuming and can require significant processing power. Moreover, in some cases, the video quality of the encoded version can be inferior to that of the originally uploaded video.

Additionally, videos uploaded to the video system of the social networking system can be viewed, consumed, or otherwise accessed by one or more viewers. When a viewer requests to view a particular video, conventional approaches can provide the encoded version of the particular requested video. However, such conventional approaches typically deliver the encoded version based on the viewer's download capabilities, such as the viewer's device download speed and/or bandwidth. This can result in undesirable fluctuations in video quality, such as during video playback.

In some instances, one or more videos can be presented to the viewer as he or she is browsing and/or scrolling through a feed (e.g., newsfeed) within the social networking system. The one or more videos can automatically begin to play as the viewer is scrolling through the feed. However, under conventional approaches, the automatic playback of the videos can cause the viewer's computing device to be slow. The automatic playback of the videos can also consume an undesirable amount of data for the viewer, especially when the viewer has a limited cellular data plan. As such, for these and other reasons, conventional approaches to handling videos can be inefficient, unreliable, and impractical.

Therefore, an improved approach can be beneficial for addressing or alleviating various concerns associated with conventional approaches. The disclosed technology can enable transitioning between multiple video portions produced based on (i.e., based at least in part on) multiple encodings. Various embodiments of the present disclosure can identify a beginning portion and a remaining portion of a video to be encoded. A first constant quality variable bit rate encoding process can be applied to the beginning portion, based on a first set of encoding parameters, to produce an encoded beginning portion. A second constant quality variable bit rate encoding process can be applied to the remaining portion, based on a second set of encoding parameters, to produce an encoded remaining portion. The encoded beginning portion can be provided for video playback. The encoded remaining portion can be provided, when requested, for video playback subsequent to the encoded beginning portion. It is contemplated that there can be many variations and/or other possibilities.

FIG. 1 illustrates an example system 100 including an example video encoding module 102 configured to facilitate transitioning between multiple video portions produced based on multiple encodings, according to an embodiment of the present disclosure. As shown in the example of FIG. 1, the video encoding module 102 can include a video identification module 104, a multiple encoding module 106, and a video providing module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the video encoding module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video encoding module 102 can be implemented, in part or in whole, as software running on one or more computing devices or systems, such as on a user or client computing device. For example, the video encoding module 102 or at least a portion thereof can be implemented as or within an application (e.g., app), a program, or an applet, etc., running on a user computing device or a client computing system, such as the user device 710 of FIG. 7. In another example, the video encoding module 102 or at least a portion thereof can be implemented using one or more computing devices or systems that include one or more servers, such as network servers or cloud servers. In some instances, the video encoding module 102 can, in part or in whole, be implemented within or configured to operate in conjunction with a social networking system (or service), such as the social networking system 730 of FIG. 7. It should be understood that there can be many variations or other possibilities.

Furthermore, in some embodiments, the video encoding module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data. In some embodiments, the at least one data store 110 can store information, such as video information, that is utilized by the video encoding module 102. It should be appreciated that there can be many variations or other possibilities.

The video identification module 104 can be configured to facilitate identifying a video that is to be encoded. In some embodiments, the video identification module 104 can identify each video uploaded to the social networking system as a candidate for encoding. Often times, when a video is accessed or played back by a user of the social networking system (i.e., a viewer of the video), the first few seconds of the video can be particularly significant and/or informative. In one example, the interesting part of the video occurs within the first few seconds, such that the viewer stops playing the video after those first few seconds. In another example, the viewer can determine, within the first few seconds, that he or she is not interested in the video and thus ends the video playback. Moreover, in some cases, automatic video playback can be enabled while the viewer is scrolling through a social feed, but many of the videos automatically played are of little or no interest to the viewer and thus the viewer's computing resources are wasted. Therefore, for these and other reasons, it can be beneficial to process or handle the first few seconds differently from the rest of the video. For instance, a beginning portion of the video including the first few seconds can be encoded such that the beginning portion is smaller in data size (e.g., lower detail), loads faster, and/or consumes less computing resources for the viewer.

The video identification module 104 can identify the beginning portion (as well as a remaining portion) of the video to be encoded. The beginning portion of the video can correspond to the first few seconds (or the first few frames) of the video, while the remaining portion can correspond to the rest of the video. In some embodiments, the video identification module 104 can acquire, from the social networking system, usage data associated with the video. The video identification module 104 can determine, based on the usage data, that at least a specified threshold amount of viewing has occurred with respect to a particular initial duration of the video. Subsequently, the video identification module 104 can determine a duration of the beginning portion based on the particular initial duration of the video.

In one example, the video identification module 104 can acquire usage data from the social networking system indicating that a majority of viewers, or a significant number of viewers at least equal to the specified threshold amount, stop watching the video after the first 10 seconds. As such, in this example, the beginning portion of the video can be determined to be the first 10 seconds of the video. If the video is played back at, for instance, 24 frames per second, then the beginning portion of the video can correspond to the first 240 frames.

In some implementations, the duration of the beginning portion can be determined for each particular video to be encoded, thus producing different durations for the beginning portions of different videos. In some embodiments, the duration for the beginning portion can be the same for a plurality of videos to be encoded (e.g., for many videos, for most videos, for all videos, etc.). Furthermore, in some instances, machine learning can be utilized to assist in determining a suitable or optimal beginning portion duration. It should be appreciated that many variations are possible.

As discussed, it can be beneficial to reduce the data size, or file size, of the beginning portion of the video such that the beginning portion loads faster and consumes less data for viewers. Accordingly, the multiple encoding module 106 can be configured to facilitate applying a first constant quality variable bit rate encoding process to the beginning portion to produce an encoded beginning portion. The first constant quality variable bit rate encoding process can be based on (i.e., based at least in part on) a first set of encoding parameters. In some cases, this first encoding process based on the first set of encoding parameters can enable a data size for the beginning portion to be decreased as a result of being encoded, without significantly sacrificing video quality.

Moreover, the multiple encoding module 106 can be configured to facilitate applying a second constant quality variable bit rate encoding process to the remaining portion, based on a second set of encoding parameters, to produce an encoded remaining portion. In some cases, the remaining portion does not need to be especially small in data size because, for example, if the viewer has watched past the beginning portion, then the viewer is likely interested in the video and is less likely to mind a potentially longer loading time (if at all) for the remaining portion. As such, the second encoding process based on the second set of encoding parameters can produce the encoded remaining portion to be not as small in data size as the encoded beginning portion, but the second encoding process can be less expensive than the first encoding process. More details regarding the multiple encoding module 106 will be provided below with reference to FIG. 2A.

Additionally, the video providing module 108 can be configured to facilitate providing the encoded beginning portion for video playback, such as by transmitting the encoded beginning portion to a viewer's computing device (or system) at which the encoded beginning portion is to be played back. Often times, only the beginning portion of a video needs to be provided since viewers often stop the video playback after the beginning portion, as discussed previously. If the viewer still desires to view the remaining portion, the viewer (i.e., the viewer's computing device or system) can request for the remaining portion. As such, the video providing module 108 can be configured to facilitate providing, when requested, the encoded remaining portion for video playback subsequent to the video playback of the encoded beginning portion. The video proving module 108 will be discussed in more detail with reference to FIG. 2B.

Moreover, in some cases, it can be advantageous to process the most popular videos in the social networking system differently from other videos that are not as popular. The most popular videos are watched, shared, or otherwise accessed frequently, such that efficiency can be gained by improving how these videos are processed or handled. For instance, a different encoding strategy can be applied to a specified amount of most popular videos (e.g., top one percent, top ten percent, or any suitable number or percentage). As such, in some embodiments, the video identification module 104 can be configured to facilitate acquiring, from the social networking system, social engagement data associated with a particular video to be encoded. The video identification module 104 can determine, based on the social engagement data, that at least a specified threshold amount of social engagement has occurred with respect to the particular video. For example, the video identification module 104 can determine that the particular video has received a significant number of views, likes, comments, and/or shares. The multiple encoding module 106 can then apply a customized encoding process to at least a portion of the particular video. In some cases, the applying of the customized encoding process to at least the portion of the particular video can include applying a third constant quality variable bit rate encoding process to an entirety of the particular video, based on a third set of encoding parameters, to produce a particular encoded video. More details regarding the processing or handling of the most popular videos will be provided below.

Figure 2A:
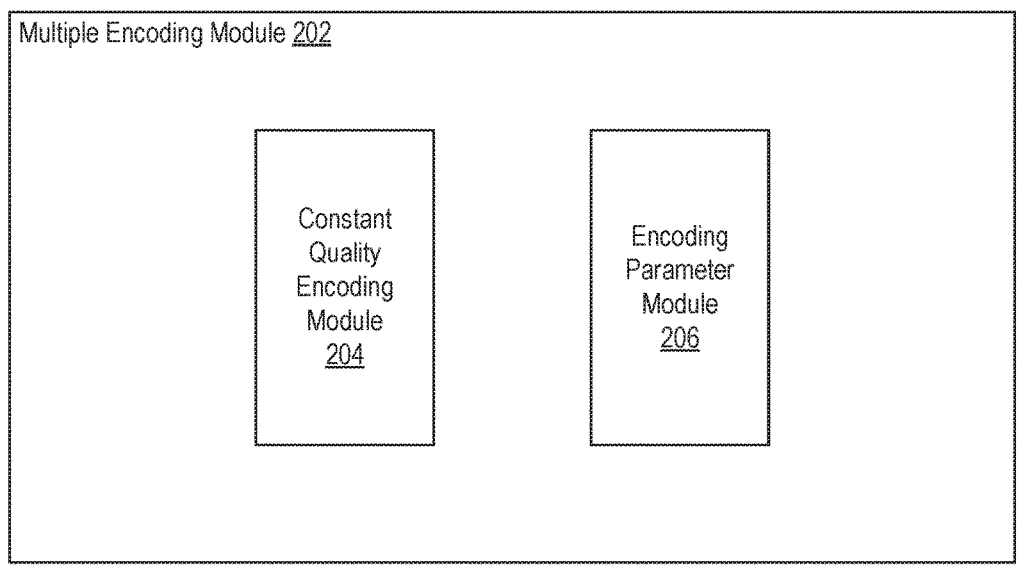
FIG. 2A illustrates an example multiple encoding module configured to facilitate transitioning between multiple video portions produced based on multiple encodings, according to an embodiment of the present disclosure.

FIG. 2A illustrates an example multiple encoding module 202 configured to facilitate transitioning between multiple video portions produced based on multiple encodings, according to an embodiment of the present disclosure. In some embodiments, the multiple encoding module 106 of FIG. 1 can be implemented as the example multiple encoding module 202. As shown in FIG. 2A, the multiple encoding module 202 can include a constant quality encoding module 204 and a encoding parameter module 206.

In some embodiments, the multiple encoding module 202 can utilize the constant quality encoding module 204 to apply a first constant quality variable bit rate encoding process to a beginning portion of a video to produce an encoded beginning portion. The first encoding process can be based on a first set of encoding parameters, which can be acquired and/or provided by the encoding parameter module 206. Moreover, the multiple encoding module 202 can also utilize the constant quality encoding module 204 to apply a second constant quality variable bit rate encoding process to a remaining portion of the video to produce an encoded remaining portion. The second encoding process can be based on a second set of encoding parameters, which can also be acquired and/or provided by the encoding parameter module 206.

In general, a constant quality encoding process can refer to a variable bit encoding process that attempts to achieve the same quality for each frame in a video being encoded. Moreover, in some instances, different encoding strategies or processes, based on different encoding parameters, can be applied to a given video such that the quality of encoded versions of the given video is still the same (or substantially similar) regardless of which encoding process was used. Often times, when using different encoding processes but maintaining the same quality, there are trade-offs between resources used and resulting data or file sizes. In one example, a more exhaustive encoding process can require more resources, such as time and computer processing power, but can produce an encoded version of the given video that is smaller in data size. In another example, a faster, light-weight encoding process can require less resources, but produces an encoded version of the given video that is larger in data size.

The disclosed technology can utilize an exhaustive or expensive encoding process to encode the beginning portion of a given video, such that the beginning portion is reduced in data size. Since the beginning portion of the video is usually short, such as being a few seconds in duration, utilizing the exhaustive or expensive encoding process does not require inappropriately large amounts of resources. Additionally, the disclosed technology can utilize a more light-weight or a cheaper encoding process to encode the remaining portion of the video. Even though the resulting data size of the remaining portion would be larger, a viewer who is interested enough in the video to watch past the beginning portion would likely not mind to potentially wait longer for the remaining portion to be transmitted and displayed.

Accordingly, as discussed, the beginning portion of the video can be encoded by the first encoding process based on the first set of encoding parameters. The first set of encoding parameters can cause the encoded beginning portion to be produced using a first amount of resources and can cause the encoded beginning portion to result in a first data size. In addition, the remaining portion of the video can be encoded by the second encoding process based on the second set of encoding parameters. The second set of encoding parameters can cause the encoded remaining portion to be produced using a second amount of resources and can cause the encoded remaining portion to result in a second data size. The encoding parameter module 206 can select and/or provide the first set and the second set such that the first amount of resources is greater than the second amount of resources and the first data size is less than the second data size. As a result, the encoded beginning portion can be smaller in data size but requires more resources to produce and the encoded remaining portion can be larger in data size but requires less resources to produce, while both portions maintain the same (or substantially the same) video quality.

Furthermore, in some implementations, the first constant quality variable bit rate encoding process and the first set of encoding parameters can be associated with a first codec, whereas the second constant quality variable bit rate encoding process and the second set of encoding parameters can be associated with a second codec different from the first codec. In one example, the first codec can correspond to VP9 or HEVC, and the second codec can correspond to H.264. It should be understood that this example of heterogeneous codecs and other examples herein are provided for illustrative purposes. There can be many variations or other possibilities.

Moreover, as discussed above, the disclosed technology can, in some cases, process popular videos differently from other videos that are not as popular. In some embodiments, the multiple encoding module 202 can apply a customized encoding process to at least a portion of a sufficiently popular video, such as a video that has received at least a threshold amount of social engagement (e.g., likes, comments, shares, views, etc.). For instance, a third constant quality variable bit rate encoding process can be applied to an entirety of the popular video, based on a third set of encoding parameters, to produce an encoded popular video. In some cases, the third encoding process based on the third set of encoding parameters can correspond to an exhaustive encoding process that requires more resources to produce the encoded popular video in a smaller data size. The smaller data size can be beneficial since the popular video is viewed and shared frequently. Moreover, since there are relatively few popular videos (e.g., top one percent, top ten percent, etc.), the exhaustive encoding process does not require an undesirably large amount of resources. In one example, the third encoding process and/or the third set of encoding parameters can be the same as (or substantially similar to) the first encoding process and/or the first set of encoding parameters. Again, many variations are possible.

Figure 2B:
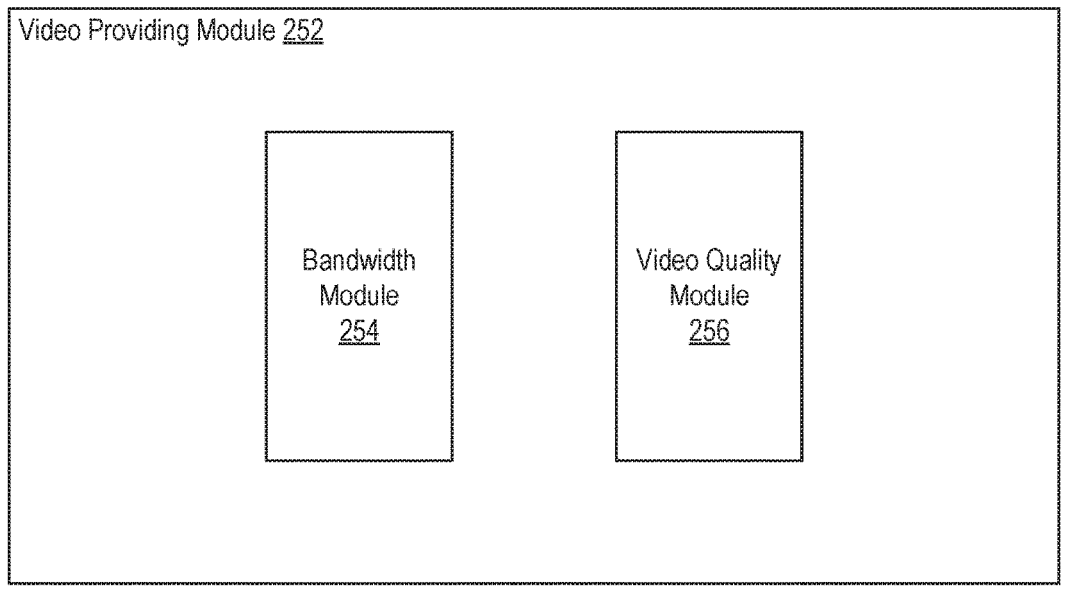
FIG. 2B illustrates an example video providing module configured to facilitate transitioning between multiple video portions produced based on multiple encodings, according to an embodiment of the present disclosure.

FIG. 2B illustrates an example video providing module 252 configured to facilitate transitioning between multiple video portions produced based on multiple encodings, according to an embodiment of the present disclosure. In some embodiments, the video providing module 108 of FIG. 1 can be implemented as the example video providing module 252. As shown in FIG. 2B, the video providing module 252 can include a bandwidth module 254 and a video quality module 256.

As discussed previously, the video providing module 252 can be configured to provide the encoded beginning portion for video playback and to provide, when requested, the encoded remaining portion for video playback subsequent to the encoded beginning portion. In some embodiments, the video providing module 252 can utilize the bandwidth module 254 to provide the encoded beginning portion in association with a first bandwidth amount and to provide the encoded remaining portion in association with a second bandwidth amount.

The bandwidth module 254 can ensure that the first bandwidth amount for providing the encoded beginning portion is less than the second bandwidth amount for providing the encoded remaining portion. From the viewer's perspective, this can result in a smooth and/or seamless transition from the video playback of the encoded beginning portion to the video playback of the encoded remaining portion (when requested). By ensuring that the first bandwidth amount is less than the second bandwidth amount, the providing of the encoded remaining portion, if and when requested, will be within the viewer's bandwidth limitations. Since the encoded beginning portion is lesser in data size than the encoded remaining portion, the providing of the encoded beginning portion will also be within the viewer's bandwidth limitations. Further, since the two portions can have the same video quality, the playback of the video will not suffer a quality degradation due to the transition from the encoded beginning portion to the encoded remaining portion.

Moreover, in some embodiments, the video providing module 252 can utilize the video quality module 256 to check, confirm, and/or ensure, prior to the providing of the encoded beginning and remaining portions, that a first video quality of the encoded beginning portion is within a specified allowable deviation from (i.e., is substantially similar to) a second video quality of the encoded remaining portion. In some instances, the video quality module 256 can determine each of the first video quality and the second video quality based on at least one of a structural similarity (SSIM) index or a peak signal-to-noise ratio (PSNR). It should be appreciated that there can be many variations or other possibilities.

Figure 3:
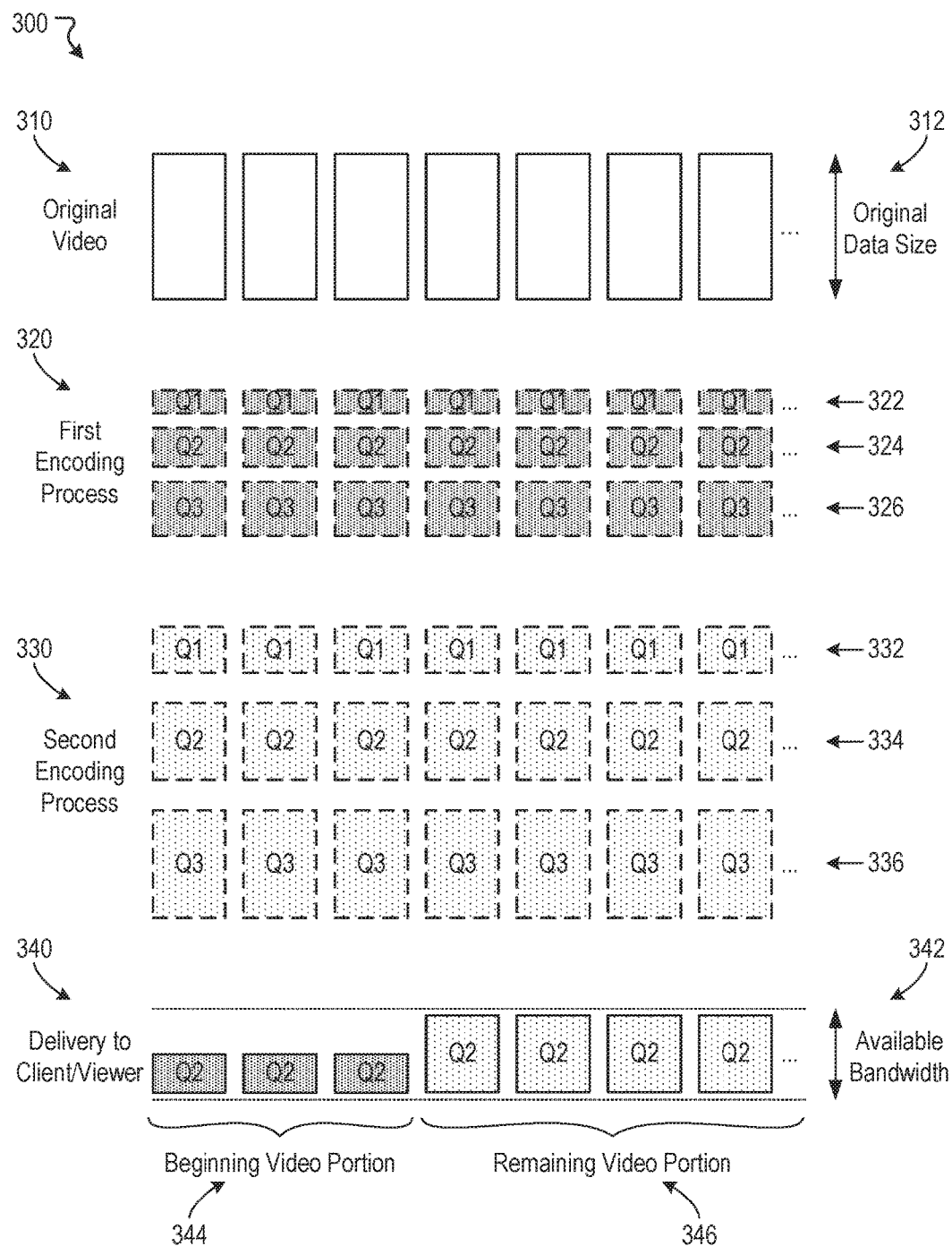
FIG. 3 illustrates an example scenario associated with transitioning between multiple video portions produced based on multiple encodings, according to an embodiment of the present disclosure.

FIG. 3 illustrates an example scenario 300 associated with transitioning between multiple video portions produced based on multiple encodings, according to an embodiment of the present disclosure. The example scenario 300 illustrates an originally uploaded video (i.e., original video) 310, potential encoded versions of the original video based on a first encoding process 320, potential encoded versions of the original video based on a second encoding process 330, and an encoded version 340 of the original video that is delivered or provided to a viewer of the video (i.e., to a client).

As shown in the example scenario 300, the original video 310 can be made up of a plurality video segments or chunks that are sequentially combinable. The original video 310 and its segments can also be associated with a particular data or file size, the original data size 312. The example scenario 300 also illustrates various options for encoding the original video 310. In this example, if a first encoding process 320 is applied to the original video 310, a low-quality (Q1) encoded version 322, a medium-quality (Q2) encoded version 324, and a high-quality (Q3) encoded version 326 can potentially be produced. If, for example, a second encoding process 330 is applied to the original video 310, a low-quality (Q1) encoded version 332, a medium-quality (Q2) encoded version 334, and a high-quality (Q3) encoded version 336 can also potentially be produced.

In this example scenario 300, the first encoding process 320 can, in general, use more resources (e.g., time, processing power, etc.) than the second encoding process 330. However, the first encoding process 320 can produce encoded videos that are lesser in data size than those produced with the second encoding process 330. In the example, data size can be represented vertically. As such, the Q1 version 322 encoded via the first encoding process 320 is lesser in data size (e.g., shorter in height) than the Q1 version 332 encoded via the second encoding process 330, even though both versions 322 and 332 have the same video quality, Q1. The same is true for the Q2 versions 324 and 334 as well as for the Q3 versions 326 and 336.

As discussed above, the disclosed technology can provide a smooth and/or seamless transition between providing a beginning portion of a video and providing a remaining portion of the video (when requested). In this example scenario 300, the disclosed technology can determine, such as by utilizing the bandwidth module 254 of FIG. 2, a maximum available bandwidth 342 for a viewer (i.e., a computing device of the viewer/client). Based on the available bandwidth 342, a maximum data size for the remaining portion encoded using the second encoding process 330 can be determined, calculated, or predicted. In this example, the Q2 version 334 encoded via the second encoding process 330 is determined, calculated, or predicted, based on the client's available bandwidth 342, to have the highest possible quality and the maximum data size suitable for delivery to the client as the remaining portion 346 of the video. Moreover, in order to maintain the same quality during the transition, the beginning portion 344 of the video is determined to be the Q2 version 324 encoded via the first encoding process 320.

It is important to note that, in this example, the disclosed technology can prevent the beginning portion to be provided as the Q3 version 326 encoded via the first encoding process 320. This is because if the viewer requests for the remaining portion, the Q2 version 334 encoded via the second encoding process 320, not the Q3 version 336, will be provided due to the client's available bandwidth 342. It should also be noted that the encoded versions potentially produced based on the first and second encoding processes can, but do not necessarily have to be produced. As such, in this example, the encoded versions are illustrated by dashed lines. However, the encoded version 340 for delivery to the client/viewer must be produced and is thus illustrated by solid lines. Furthermore, it is contemplated that the examples herein and their associated details are provided for illustrative purposes. There can be many variations or other possibilities.

Figure 4:
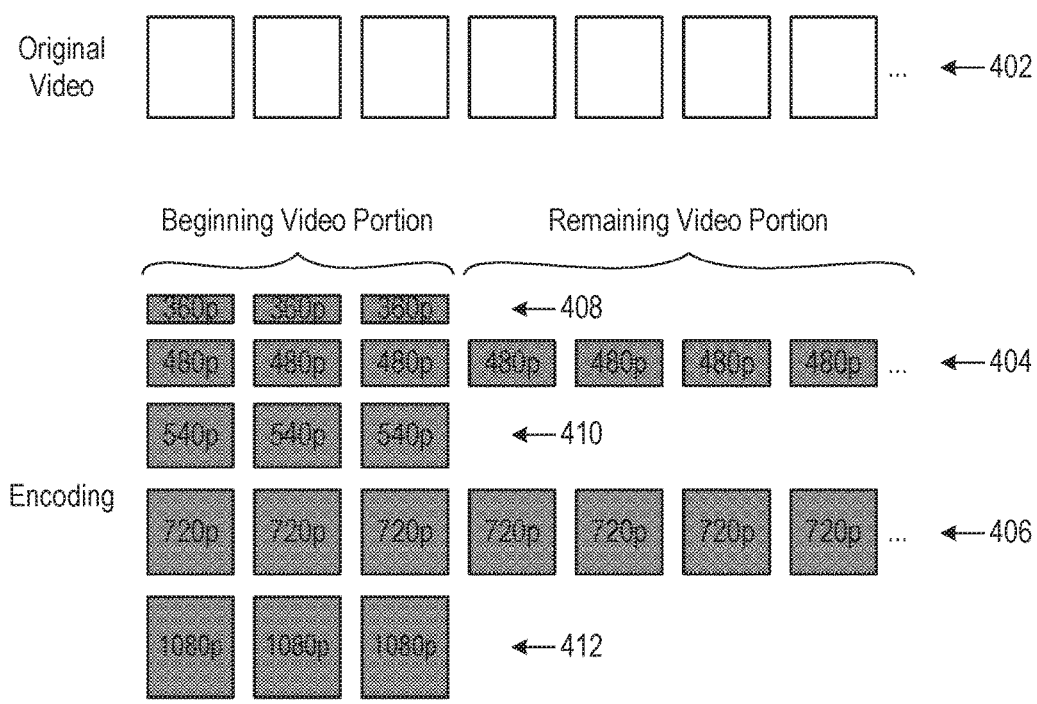
FIG. 4 illustrates an example scenario associated with transitioning between multiple video portions produced based on multiple encodings, according to an embodiment of the present disclosure.

FIG. 4 illustrates an example scenario 400 associated with transitioning between multiple video portions produced based on multiple encodings, according to an embodiment of the present disclosure. The example scenario 400 shows an originally uploaded video 402 and two encoded versions (e.g., videos 404 and 406) of the entire originally uploaded video.

In some cases, an encoded beginning portion of the video can be included within a plurality of encoded beginning portions, as shown in this example scenario 400. In some embodiments, each of the plurality of encoded beginning portions can be respectively associated with a different resolution. As shown in FIG. 4, there can be a 360p encoded version 404 of the beginning portion, a 480p encoded version 406 of the beginning and remaining portions, a 540p encoded version 408 of the beginning portion, a 720p encoded version 410 of the beginning and remaining portions, and a 1080p encoded version 412 of the beginning portion.

In some implementations, whichever of the plurality of beginning portions is provided to a viewer can be dependent upon a computing device (or system) of the viewer. The disclosed technology can acquire information about the viewer's device, such as information about screen size, operating system, etc. Based on the information, the disclosed technology can provide the appropriate beginning portion out of the plurality of beginning portions. Again, many variations are possible.

Figure 5:
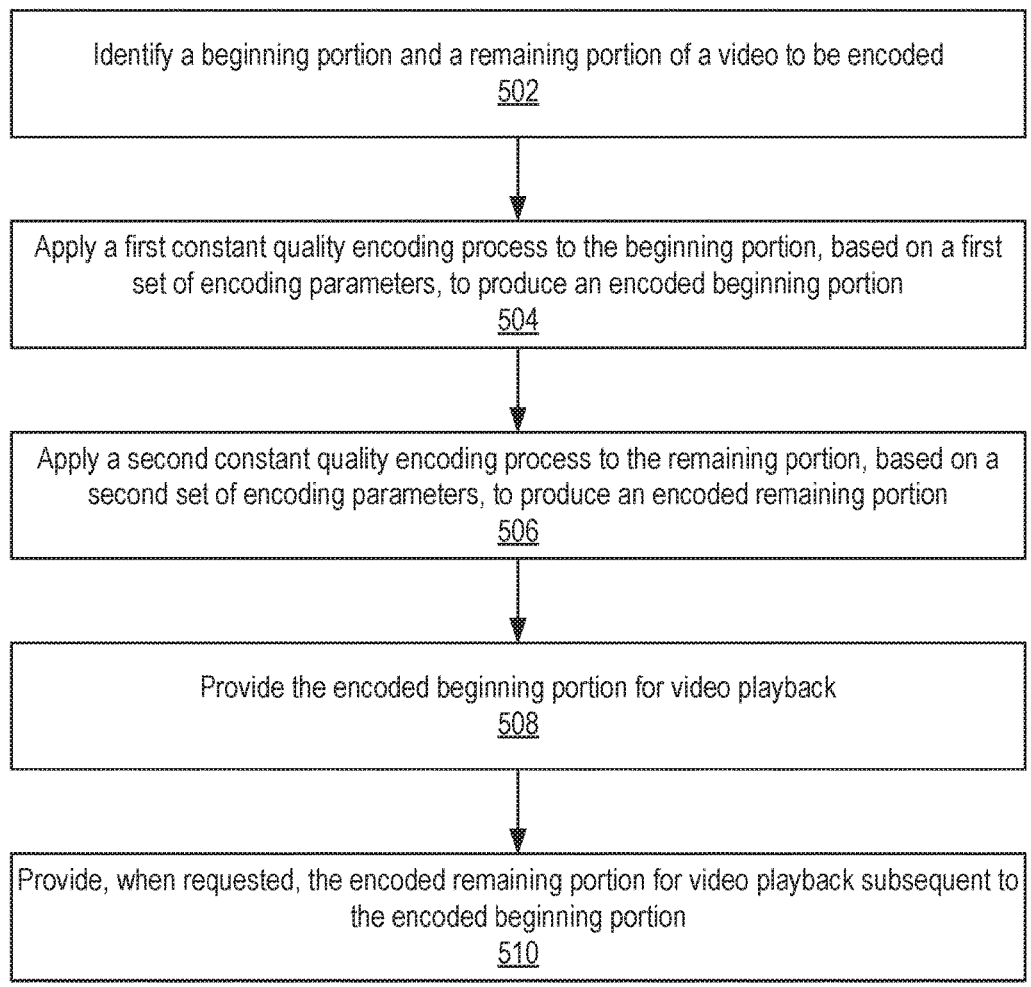
FIG. 5 illustrates an example method associated with transitioning between multiple video portions produced based on multiple encodings, according to an embodiment of the present disclosure.

FIG. 5 illustrates an example method 500 associated with transitioning between multiple video portions produced based on multiple encodings, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a beginning portion and a remaining portion of a video to be encoded. At block 504, the example method 500 can apply a first constant quality variable bit rate encoding process to the beginning portion, based on a first set of encoding parameters, to produce an encoded beginning portion. At block 506, the example method 500 can apply a second constant quality variable bit rate encoding process to the remaining portion, based on a second set of encoding parameters, to produce an encoded remaining portion. At block 508, the example method 500 can provide the encoded beginning portion for video playback. At block 510, the example method 500 can provide, when requested, the encoded remaining portion for video playback subsequent to the encoded beginning portion.

Figure 6A:
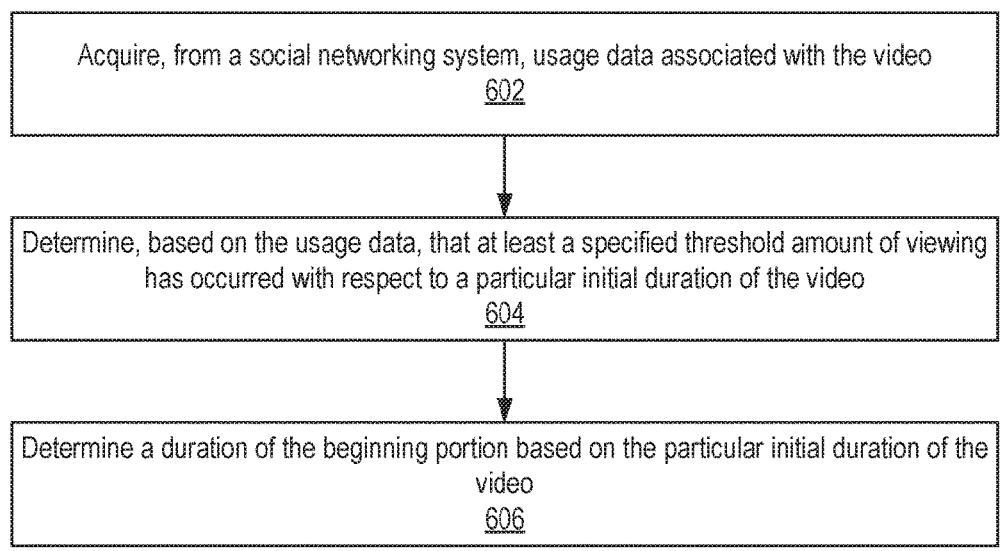
FIG. 6A illustrates an example method associated with transitioning between multiple video portions produced based on multiple encodings, according to an embodiment of the present disclosure.

FIG. 6A illustrates an example method 600 associated with transitioning between multiple video portions produced based on multiple encodings, according to an embodiment of the present disclosure. As discussed above, it should be understood that there can be additional, fewer, or alternative steps performed in similar or alternative orders, or in parallel, within the scope of the various embodiments unless otherwise stated.

At block 602, the example method 600 can acquire, from a social networking system, usage data associated with the video. At block 604, the example method 600 can determine, based on the usage data, that at least a specified threshold amount of viewing has occurred with respect to a particular initial duration of the video. At block 606, the example method 600 can determine a duration of the beginning portion based on the particular initial duration of the video.

Figure 6B:
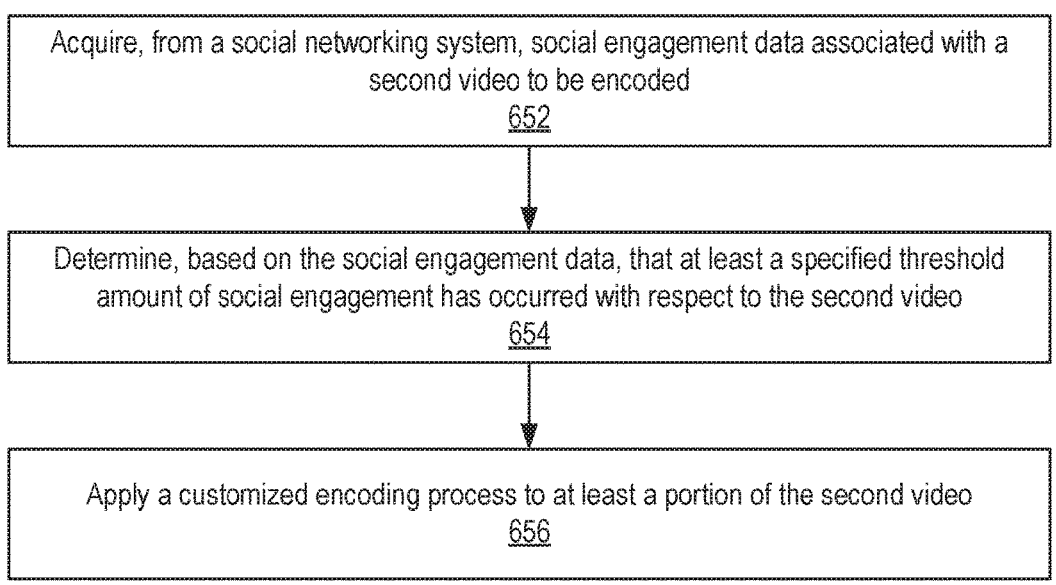
FIG. 6B illustrates an example method associated with transitioning between multiple video portions produced based on multiple encodings, according to an embodiment of the present disclosure.

FIG. 6B illustrates an example method 650 associated with transitioning between multiple video portions produced based on multiple encodings, according to an embodiment of the present disclosure. Again, it should be understood that there can be additional, fewer, or alternative steps performed in similar or alternative orders, or in parallel, within the scope of the various embodiments unless otherwise stated.

At block 652, the example method 650 can acquire, from a social networking system, social engagement data associated with a second video to be encoded. At block 654, the example method 650 can determine, based on the social engagement data, that at least a specified threshold amount of social engagement has occurred with respect to the second video. At block 656, the example method 650 can apply a customized encoding process to at least a portion of the second video In some embodiments, an image softening process can be applied to at least a sub-portion of the beginning portion to produce a softened sub-portion prior to the applying of the first constant quality variable bit rate encoding process to the beginning portion. The encoded beginning portion can include an encoded softened sub-portion. The encoded softened sub-portion can be lesser in data size than the encoded beginning portion.

In some embodiments, each of the providing of the encoded beginning portion and the providing of the encoded remaining portion can be based on a manifest file associated with the video. For example, the manifest file can provide logic for determining which encoded versions are to be provided based on available bandwidth.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
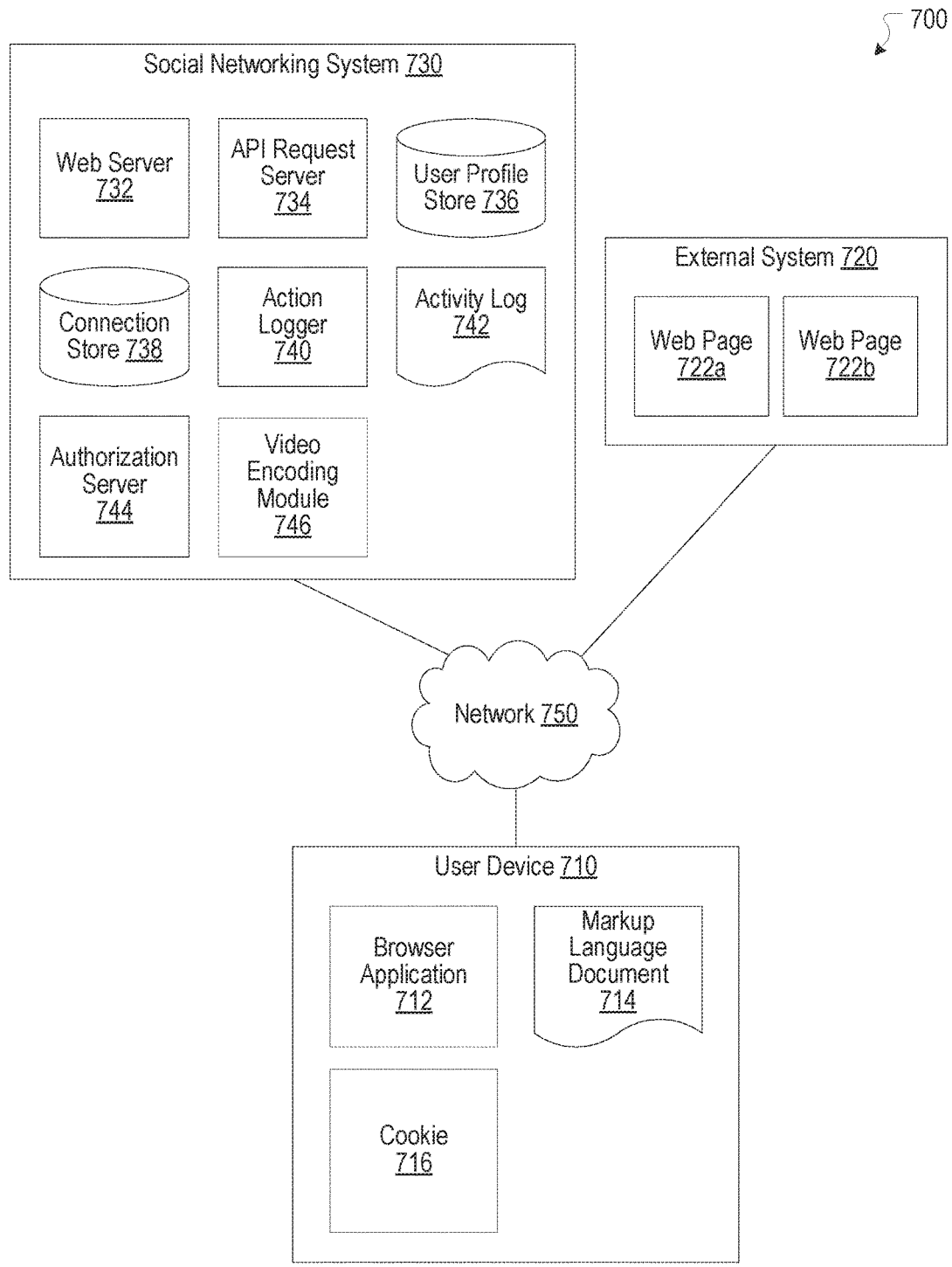
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), an Apple OS X operating system, and/or a Linux operating system distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as the iOS operating system and the ANDROID operating system. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include data based on the JavaScript Object Notation (JSON) data format, the JSON with padding (JSONP) extension, and the JavaScript programming language to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as content that utilizes and/or was created using the Java programming language, the JavaScript programming language, the Flash software platform, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a video encoding module 746. The video encoding module 746 can, for example, be implemented as the video encoding module 102 of FIG. 1. As discussed previously, it should be appreciated that there can be many variations or other possibilities. Other features of the video encoding module 746 are discussed herein in connection with the video encoding module 102.

Hardware Implementation

Figure 8:
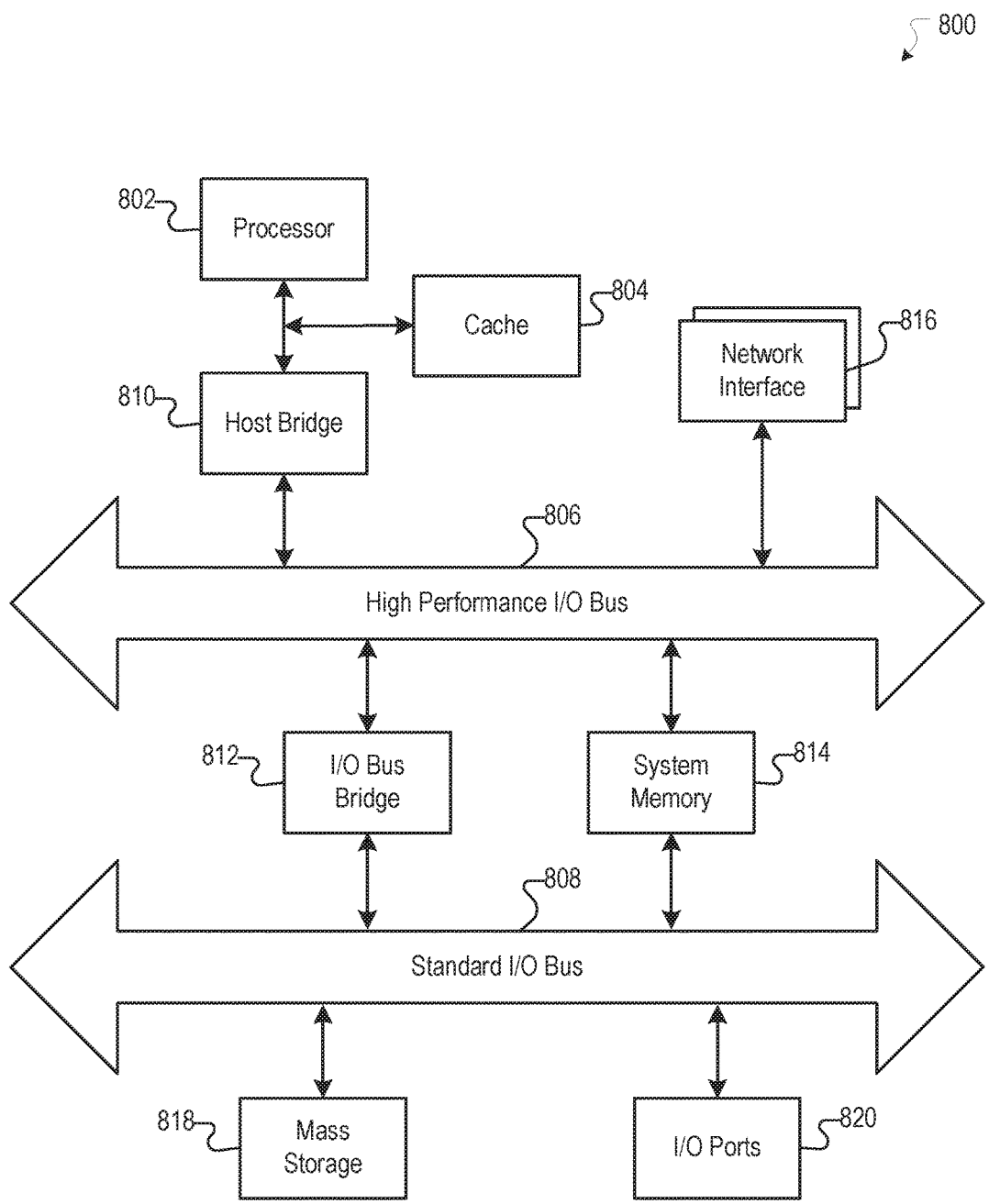
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, that at least a specified threshold amount of viewing has occurred with respect to a particular initial duration of a video to be encoded based on social networking system usage data associated with the video;
    determining, by the computing system, a duration of a beginning portion of the video based on the particular initial duration of the video;
    applying, by the computing system, a first constant quality variable bit rate encoding process to the beginning portion of the video to produce an encoded beginning portion;
    applying, by the computing system, a second constant quality variable bit rate encoding process to a remaining portion of the video to produce an encoded remaining portion, the second constant quality variable bit rate encoding process being different from the first constant quality variable bit rate encoding process; and
    transmitting, by the computing system, the video including the encoded beginning portion and the encoded remaining portion for display on a client computing device.

2. The computer-implemented method of claim 1, wherein
    the first constant quality variable bit rate encoding process is applied to the beginning portion based on a first set of encoding parameters,
    the second constant quality variable bit rate encoding process is applied to the remaining portion based on a second set of encoding parameters,
    the first set of encoding parameters causes the encoded beginning portion to result in a first data size,
    the second set of encoding parameters causes the encoded remaining portion to result in a second data size, and
    the first data size is less than the second data size.

3. The computer-implemented method of claim 2, wherein the first constant quality variable bit rate encoding process and the first set of encoding parameters are associated with a first codec, and wherein the second constant quality variable bit rate encoding process and the second set of encoding parameters are associated with a second codec different from the first codec.

4. The computer-implemented method of claim 1, wherein
    a first video quality of the encoded beginning portion is within a specified allowable deviation from a second video quality of the encoded remaining portion,
    the encoded beginning portion is associated with a first bandwidth amount,
    the encoded remaining portion is associated with a second bandwidth amount, and
    the first bandwidth amount is less than the second bandwidth amount.

5. The computer-implemented method of claim 4, wherein each of the first video quality and the second video quality is determined based on at least one of a structural similarity (SSIM) index or a peak signal-to-noise ratio (PSNR).

6. The computer-implemented method of claim 1, further comprising:
    applying an image softening process to at least a sub-portion of the beginning portion to produce a softened sub-portion prior to the applying of the first constant quality variable bit rate encoding process to the beginning portion, wherein the encoded beginning portion includes an encoded softened sub-portion, and wherein the encoded softened sub-portion is lesser in data size than the encoded beginning portion.

7. The computer-implemented method of claim 1, wherein the encoded beginning portion is included within a plurality of encoded beginning portions, and wherein each of the plurality of encoded beginning portions is respectively associated with a different resolution.

8. The computer-implemented method of claim 1, further comprising:
    acquiring, from a social networking system, social engagement data associated with a second video to be encoded;
    determining, based on the social engagement data, that at least a specified threshold amount of social engagement has occurred with respect to the second video; and
    applying a customized encoding process to at least a portion of the second video.

9. The computer-implemented method of claim 8, wherein the applying of the customized encoding process to at least the portion of the second video includes applying a third constant quality variable bit rate encoding process to an entirety of the second video to produce an encoded second video.

10. A system comprising:
    at least one processor; and
    a memory storing instructions that, when executed by the at least one processor, cause the system to perform:
    determining a duration of a beginning portion of a video to be encoded based on social determining that at least a specified threshold amount of viewing has occurred with respect to a particular initial duration of a video to be encoded based on social networking system usage data associated with the video;
    determining a duration of a beginning portion of the video based on the particular initial duration of the video;
    applying a first constant quality variable bit rate encoding process to the beginning portion of the video to produce an encoded beginning portion;
    applying a second constant quality variable bit rate encoding process to a remaining portion of the video to produce an encoded remaining portion, the second constant quality variable bit rate encoding process being different from the first constant quality variable bit rate encoding process; and
    transmitting the video including the encoded beginning portion and the encoded remaining portion for display on a client computing device.

11. The system of claim 10, wherein
    the first constant quality variable bit rate encoding process is applied to the beginning portion based on a first set of encoding parameters,
    the second constant quality variable bit rate encoding process is applied to the remaining portion based on a second set of encoding parameters,
    the first set of encoding parameters causes the encoded beginning portion to result in a first data size,
    the second set of encoding parameters causes the encoded remaining portion to result in a second data size, and
    the first data size is less than the second data size.

12. The system of claim 11, wherein the first constant quality variable bit rate encoding process and the first set of encoding parameters are associated with a first codec, and wherein the second constant quality variable bit rate encoding process and the second set of encoding parameters are associated with a second codec different from the first codec.

13. The system of claim 10, wherein
a first video quality of the encoded beginning portion is within a specified allowable deviation from a second video quality of the encoded remaining portion,
the encoded beginning portion is associated with a first bandwidth amount,
the encoded remaining portion is associated with a second bandwidth amount, and
the first bandwidth amount is less than the second bandwidth amount.

14. The system of claim 13, wherein each of the first video quality and the second video quality is determined based on at least one of a structural similarity (SSIM) index or a peak signal-to-noise ratio (PSNR).

15. A non-transitory computer-readable storage medium including instructions that, when executed by at least one processor of a computing system, cause the computing system to perform:
determining that at least a specified threshold amount of viewing has occurred with respect to a particular initial duration of a video to be encoded based on social networking system usage data associated with the video;
determining a duration of a beginning portion of the video based on the particular initial duration of the video;
applying a first constant quality variable bit rate encoding process to the beginning portion of the video to produce an encoded beginning portion;
applying a second constant quality variable bit rate encoding process to a remaining portion of the video to produce an encoded remaining portion, the second constant quality variable bit rate encoding process being different from the first constant quality variable bit rate encoding process; and
transmitting the video including the encoded beginning portion and the encoded remaining portion for display on a client computing device.

16. The non-transitory computer-readable storage medium of claim 15, wherein
the first constant quality variable bit rate encoding process is applied to the beginning portion based on a first set of encoding parameters,
the second constant quality variable bit rate encoding process is applied to the remaining portion based on a second set of encoding parameters,
the first set of encoding parameters causes the encoded beginning portion to result in a first data size,
the second set of encoding parameters causes the encoded remaining portion to result in a second data size, and
the first data size is less than the second data size.

17. The non-transitory computer-readable storage medium of claim 16, wherein the first constant quality variable bit rate encoding process and the first set of encoding parameters are associated with a first codec, and wherein the second constant quality variable bit rate encoding process and the second set of encoding parameters are associated with a second codec different from the first codec.

18. The non-transitory computer-readable storage medium of claim 15, wherein
a first video quality of the encoded beginning portion is within a specified allowable deviation from a second video quality of the encoded remaining portion,
the encoded beginning portion is associated with a first bandwidth amount,
the encoded remaining portion is associated with a second bandwidth amount, and
the first bandwidth amount is less than the second bandwidth amount.

19. The non-transitory computer-readable storage medium of claim 18, wherein each of the first video quality and the second video quality is determined based on at least one of a structural similarity (SSIM) index or a peak signal-to-noise ratio (PSNR).

* * * * *